US009143017B2

(12) United States Patent
Horng et al.

(10) Patent No.: US 9,143,017 B2
(45) Date of Patent: Sep. 22, 2015

(54) MOTOR STRUCTURE

(71) Applicant: Sunonwealth Electric Machine Industry Co., Ltd., Kaohsiung (TW)

(72) Inventors: Alex Horng, Kaohsiung (TW); Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 359 days.

(21) Appl. No.: 13/855,811

(22) Filed: Apr. 3, 2013

(65) Prior Publication Data

US 2013/0214622 A1 Aug. 22, 2013

Related U.S. Application Data

(63) Continuation-in-part of application No. 12/174,687, filed on Jul. 17, 2008, now abandoned, which is a continuation-in-part of application No. 12/155,959, filed on Jun. 12, 2008, now abandoned.

(30) Foreign Application Priority Data

Apr. 14, 2008 (TW) .............................. 097113452 A

(51) Int. Cl.
*H02K 5/16* (2006.01)
*H02K 5/167* (2006.01)
*F16C 17/02* (2006.01)
*G11B 19/20* (2006.01)
*H02K 1/18* (2006.01)
*H02K 7/08* (2006.01)

(52) U.S. Cl.
CPC ................ *H02K 5/167* (2013.01); *F16C 17/02* (2013.01); *G11B 19/2009* (2013.01); *H02K 1/187* (2013.01); *H02K 7/085* (2013.01); *F16C 2370/12* (2013.01)

(58) Field of Classification Search
CPC .................................. H02K 5/16; H02K 5/167
USPC ............................. 310/90, 67 R, 43, 40 MM, 310/156.12–156.14
See application file for complete search history.

(56) References Cited

U.S. PATENT DOCUMENTS

| | | | |
|---|---|---|---|
| 6,265,798 B1 | 7/2001 | Huang et al. | |
| 6,376,946 B1 * | 4/2002 | Lee | ............... 310/67 R |
| 6,654,213 B2 | 11/2003 | Horng et al. | |
| 6,787,956 B2 | 9/2004 | Sun | |
| 6,869,221 B2 | 3/2005 | Horng et al. | |
| 2003/0156366 A1 * | 8/2003 | Horng et al. | ..................... 361/23 |
| 2003/0222522 A1 * | 12/2003 | Chang et al. | .................... 310/90 |

(Continued)

*Primary Examiner* — Michael Andrews
(74) *Attorney, Agent, or Firm* — Alan D. Kamrath; Kamrath IP Lawfirm, P.A.

(57) ABSTRACT

A motor structure includes a housing having a shaft tube receiving a shaft retaining assembly. The shaft tube includes a positioning member on an outer periphery thereof. A rotor includes a shaft rotatably extending through the bearing. A stator is mounted around the shaft tube, couples with the positioning member, and includes a bobbin having an abutting portion pressing a top face of the shaft retaining assembly by a free end thereof. Specifically, the positioning member is distant from the top face by a first distance in an axial direction of the shaft tube, the abutting portion is made of elastic material, the positioning member is distant from the free end by a second distance in an axial direction of the assembling hole is defined, and the second distance is smaller than the first distance when the stator is separate from the shaft tube.

7 Claims, 9 Drawing Sheets

(56) References Cited

U.S. PATENT DOCUMENTS

| | | |
|---|---|---|
| 2004/0227422 A1 | 11/2004 | Chang et al. |
| 2005/0046286 A1 | 3/2005 | Horng et al. |
| 2005/0184609 A1 | 8/2005 | Chen et al. |
| 2005/0275299 A1 | 12/2005 | Horng et al. |
| 2006/0006746 A1 | 1/2006 | Nishikata et al. |
| 2007/0022597 A1 | 2/2007 | Shimura et al. |
| 2007/0284957 A1 | 12/2007 | Horng et al. |
| 2008/0056627 A1 | 3/2008 | Horng et al. |
| 2008/0056630 A1 | 3/2008 | Horng et al. |
| 2008/0157633 A1 | 7/2008 | Yang et al. |
| 2010/0109460 A1* | 5/2010 | Horng ............................ 310/90 |
| 2010/0272586 A1* | 10/2010 | Hsu et al. ....................... 310/88 |
| 2010/0329901 A1* | 12/2010 | Horng ............................ 310/90 |
| 2011/0057538 A1* | 3/2011 | Horng et al. ........... 310/216.113 |

\* cited by examiner

MOTOR STRUCTURE

CROSS REFERENCE TO RELATED APPLICATION

This application is a continuation-in-part application of U.S. patent Ser. No. 12/174,687, filed on Jul. 17, 2008, which is a continuation-in-part application of U.S. patent Ser. No. 12/155,959, filed on Jun. 12, 2008.

BACKGROUND OF THE INVENTION

FIGS. 1 and 2 show a conventional motor structure disclosed by U.S. Pat. No. 6,654,213, which includes a housing 70, a rotor 80, and a stator 90. Referring to FIG. 1, the housing 70 includes a hollow shaft tube 71 receiving a bearing 72. The shaft tube 71 has an opening 711 at an upper end thereof for the bearing 72 to be inserted into the shaft tube 71, while the shaft tube 71 peripherally has a support face 712 facing upwards. The rotor 80 includes a shaft 81 rotatably extending through the bearing 72. The stator 90 is mounted around the shaft tube 71 and includes an upper bobbin 91, a lower bobbin 92, a plurality of silicon steel plates 93 sandwiched between the upper and lower bobbins 91 and 92, and a winding 94 wound around the silicon steel plates 93. The upper bobbin 91 includes an abutting portion 911 in the form of an annular ring extending inwards radially to block an outer rim of the opening 711, preventing disengagement of the bearing 72 from the shaft tube 71 via the opening 711. The bearing 72 and shaft tube 71 are in loose coupling with each other and have a small gap therebetween to allow easy assembly and to prevent the shaft tube 71 from being squeezed and thus deformed by the bearing 72. Furthermore, the support face 712 of the shaft tube 71 faces and abuts against the silicon steel plates 93 so as to support and position the stator 90 relatively to the housing 70.

However, referring to FIG. 2 showing a cross sectional view of the conventional motor structure while the housing 70, rotor 80, and stator 90 are assembled, it is apparent that, in an axial direction along the shaft tube 71, a first distance between the abutting portion 911 and a lower end of the plurality of silicon steel plates 93 must be equal to a second distance between the opening 711 and support face 712, or the stator 90 cannot surely rest on the support face 712 if the first distance is shorter than the second distance, or the abutting portion 911 is unable to firmly block the outer rim of the opening 711 if the first distance is longer than the second distance. Therefore, the accuracy in sizes of the housing 70 and stator 90 is extremely required. Similarly, since the abutting portion 911 merely extends inwards in radial directions of the shaft tube 71 to block the outer rim of the opening 711, a top end of the bearing 72 must just locate at the opening 711 for the abutting portion 911 to abut against. It should be noted that all of the above requirements have to be extremely fulfilled, or damages to the stator 90, especially to the abutting portion 911, or axial vibration of the bearing 72 will be caused. Accordingly, the manufacture cost of this conventional motor structure is high, in particular to those applied to miniature motors, for exactly making the housing 70, rotor 80 and stator 90 by precision machines and processes. As a result, it is necessary to improve the conventional motor structure for a lower cost of manufacture and a desirable positioning performance.

BRIEF SUMMARY OF THE INVENTION

It is therefore the objective of this invention to provide a motor structure able to achieve not only assembling convenience but also reliable assembly, and to prevent an abutting portion thereof from damage.

One embodiment of the invention discloses a motor structure having a housing, a rotor and a stator. The housing includes a shaft tube having an upper opening, with a shaft retaining assembly being received in the shaft tube and having a top face adjacent to the upper opening, with the shaft tube including a positioning member on an outer periphery thereof, with the positioning member distant from the top face by a first distance in an axial direction of the shaft tube. The rotor includes a shaft rotatably extending through the bearing. The stator includes an assembling hole receiving the outer periphery of the shaft tube, with the stator including a bobbin, a plurality of silicon steel plates coupled with the bobbin, and a winding wound around the plurality of silicon steel plates, with the stator coupling with the positioning member of the shaft tube, with the bobbin including an abutting portion pressing the top face of the shaft retaining assembly by a free end thereof. Specifically, the abutting portion is made of elastic material, a second distance between the positioning member and the free end in an axial direction of the assembling hole is defined, and the second distance is smaller than the first distance when the stator is separate from the shaft tube.

In a preferred form shown, the bobbin includes an annular wall forming an inner upper end of the bobbin, the abutting portion connects to the annular wall by a root end, and with an axial distance from the root end to the positioning member is larger than the second distance.

In the preferred form shown, the shaft tube includes an upper section and a lower section having an outer diameter larger than that of the upper section to form a support face of the positioning member, the first distance is defined between the support face and the top face, the bobbin further includes a supported face forming an inner lower end of the bobbin, and the stator couples with the positioning member by connection of the support and supported faces.

In the preferred form shown, the positioning member of shaft tube includes a plurality of annularly spaced protrusions on the outer periphery thereof, the bobbin includes an annular groove on an inner periphery thereof, and the plurality of protrusions is engaged in the annular groove to position the stator in the fixed axial position relative to the shaft tube.

In the preferred form shown, the positioning member of the shaft tube includes a plurality of annularly spaced ribs extending in the axial of the shaft tube, each of the plurality of the ribs has a support face spaced from a top edge of the shaft tube, the bobbin further includes a supported face forming an inner lower end of the bobbin, and the stator couples with the positioning member by connection of the support and supported faces.

In the preferred form shown, the outer periphery of the shaft tube further includes a limiting rib extending between and spaced from adjacent two of the ribs, the limiting rib has an upper end extending to the top edge of the shaft tube, both of the bobbin and the plurality of silicon steel plates have notches on inner peripheries thereof, the notches of the bobbin and silicon steel plates are aligned to form an axial groove extending from the supported face and communicating with the assembling hole, and the limiting rib is inserted in the axial groove.

In the preferred form shown, the stator is coupled on the outer periphery of the shaft tube by press coupling.

DESCRIPTION OF THE DRAWINGS

The illustrative embodiments may best be described by reference to the accompanying drawings where.

Figure 1:
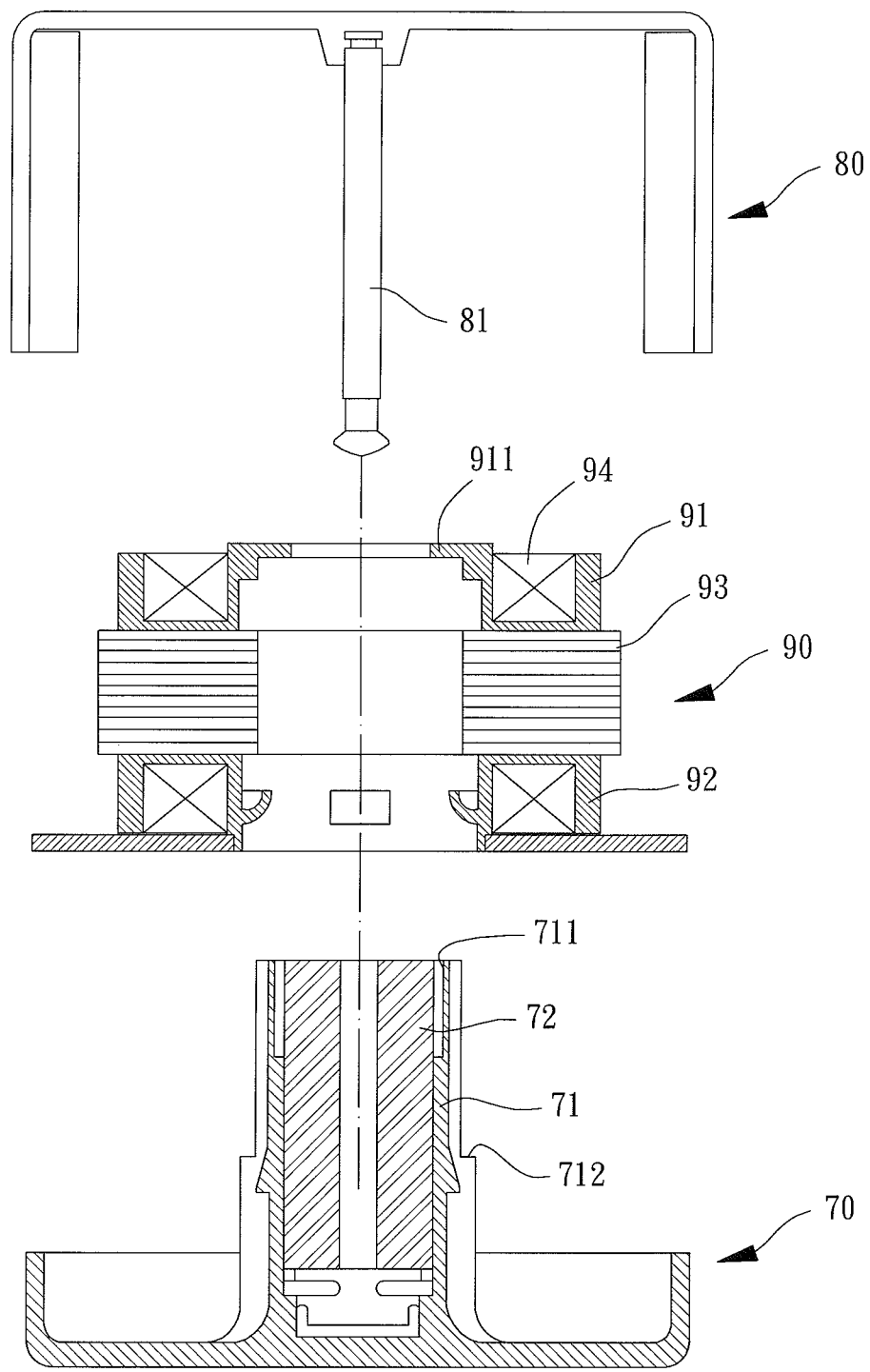
FIG. 1 shows an exploded and cross sectional view of a conventional motor structure.
Figure 2:
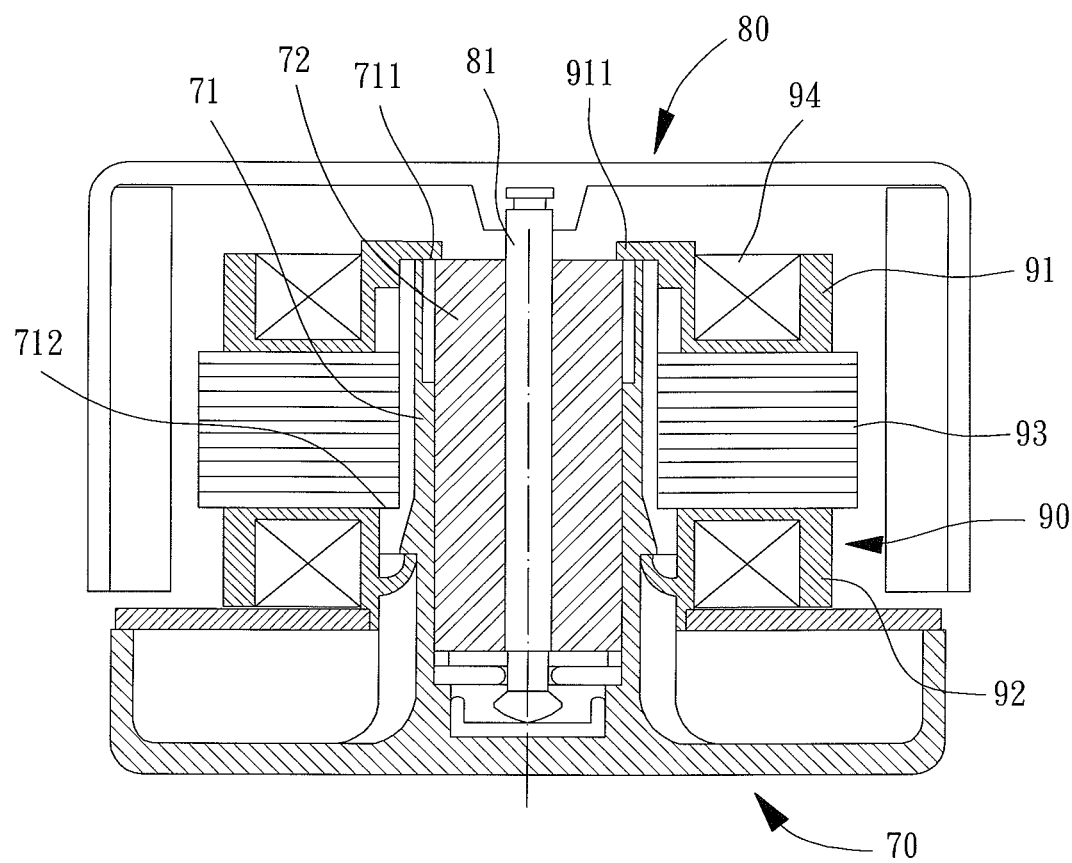
FIG. 2 shows an assembled and cross sectional view of the conventional motor structure.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top," "bottom," "lower," "upper," "end," "portion," "section," "axial," "annular," and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
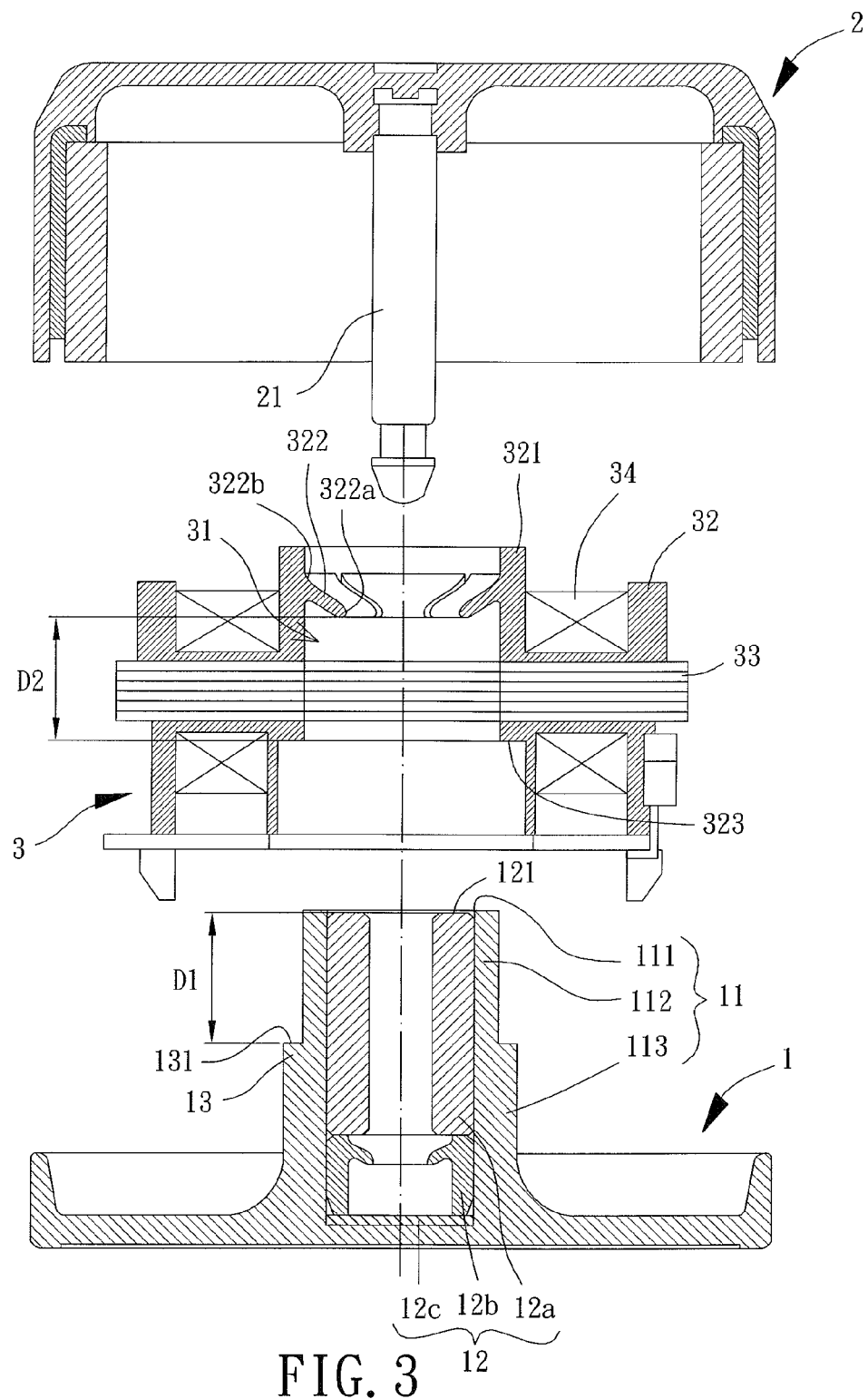
FIG. 3 shows an exploded and cross sectional view of a motor structure of a first embodiment according to the preferred teachings of the present invention.
Figure 4:
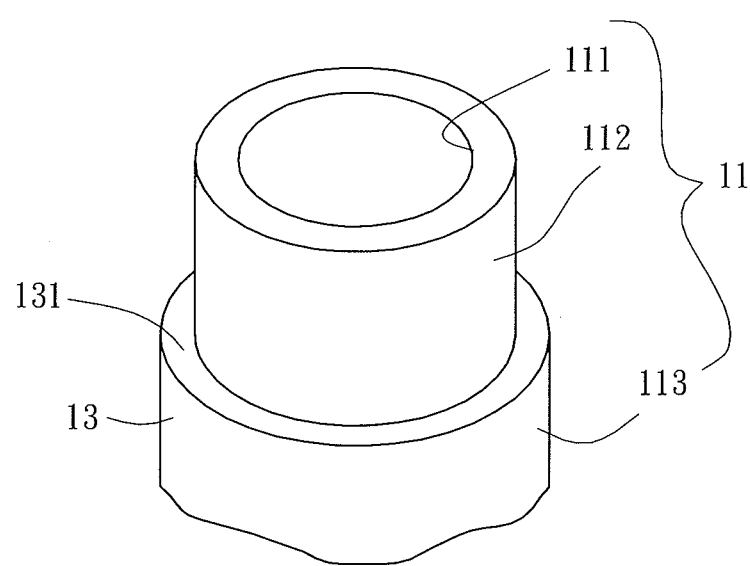
FIG. 4 shows a partial, perspective view of a shaft tube of the motor structure of FIG. 3.

A motor structure of a first embodiment according to the preferred teachings of the present invention is shown in FIGS. 3 and 4 of the drawings. According to the preferred form shown, this motor structure includes a housing 1, a rotor 2, and a stator 3. The housing 1 includes a hollow shaft tube 11 having an upper opening 111 and a sealed bottom spaced from each other in an axial direction of the shaft tube 11. The shaft tube 11 receives a shaft retaining assembly 12, which includes a bearing 12a, a retaining plate 12b, and a supporting plate 12c, and has a positioning member 13 on an outer periphery thereof so as to form a support face 131 facing upwards to the upper opening 111. Particularly, the shaft retaining assembly 12 has a top face 121, which is an upper face of the bearing 12a in this embodiment, facing upwards and adjacent to the upper opening 111. According to the most preferred form shown, the shaft tube 11 further includes an upper section 112 and a lower section 113 having an outer diameter larger than that of the upper section 112 for forming the support face 131 of the positioning member 13 between the upper and lower sections 112 and 113. Specifically, in the axial direction of the shaft tube 11, a first distance D1 between the positioning member 13 and top face 121 is defined.

The rotor 2 includes a shaft 21 in a central portion thereof. The shaft 21 is rotatably extended through the bearing 12. Thus, the rotor 2 can rotate relatively to the housing 1.

The stator 3 includes an assembling hole 31 so as to allow the stator 3 to be mounted around the shaft tube 11. Preferably, the stator 3 is coupled to the outer periphery of the shaft tube 11 by press coupling, bonding, or other suitable ways to reliably fix the stator 3 on the shaft tube 11. The stator 3 further includes a bobbin 32, a plurality of silicon steel plates 33 coupled with the bobbin 32, and a winding 34 wound around the silicon steel plates 33. The bobbin 32 includes an annular wall 321 forming an inner upper end of the bobbin 32 to provide a shielding wall preventing dust from entering an interior of the shaft tube 11 after the stator 3 is coupled with the shaft tube 11. Besides, an abutting portion 322 is formed on an inner periphery of the annular wall 321. The abutting portion 322 can be in the form of a plurality of annularly spaced plates or an annular ring, so as to abut the shaft retaining assembly 12 when the stator 3 mounted on and around the shaft tube 11, preventing disengagement of the shaft retaining assembly 12 from the shaft tube 11 via the upper opening 111. The bobbin 32 further includes a supported face 323 forming an inner lower end of the bobbin 32, which is preferably in the form of an annular flange as shown in FIG. 3. Particularly, at least the abutting portion 322, preferably the whole bobbin 32 as shown in FIG. 3, is made of elastic material such as flexible plastic or rubber, with a second distance D2 defined between the supported face 323 and a free end 322a of the abutting portion 322 in an axial direction of the assembling hole 31. Specifically, the axial directions of the assembling hole 31 and shaft tube 11 are parallel when the stator 3 is mounted around the shaft tube 11. Moreover, before the stator 3 is mounted onto and around the shaft tube 11, the second distance D2 is smaller than the first distance D1.

Figure 5:
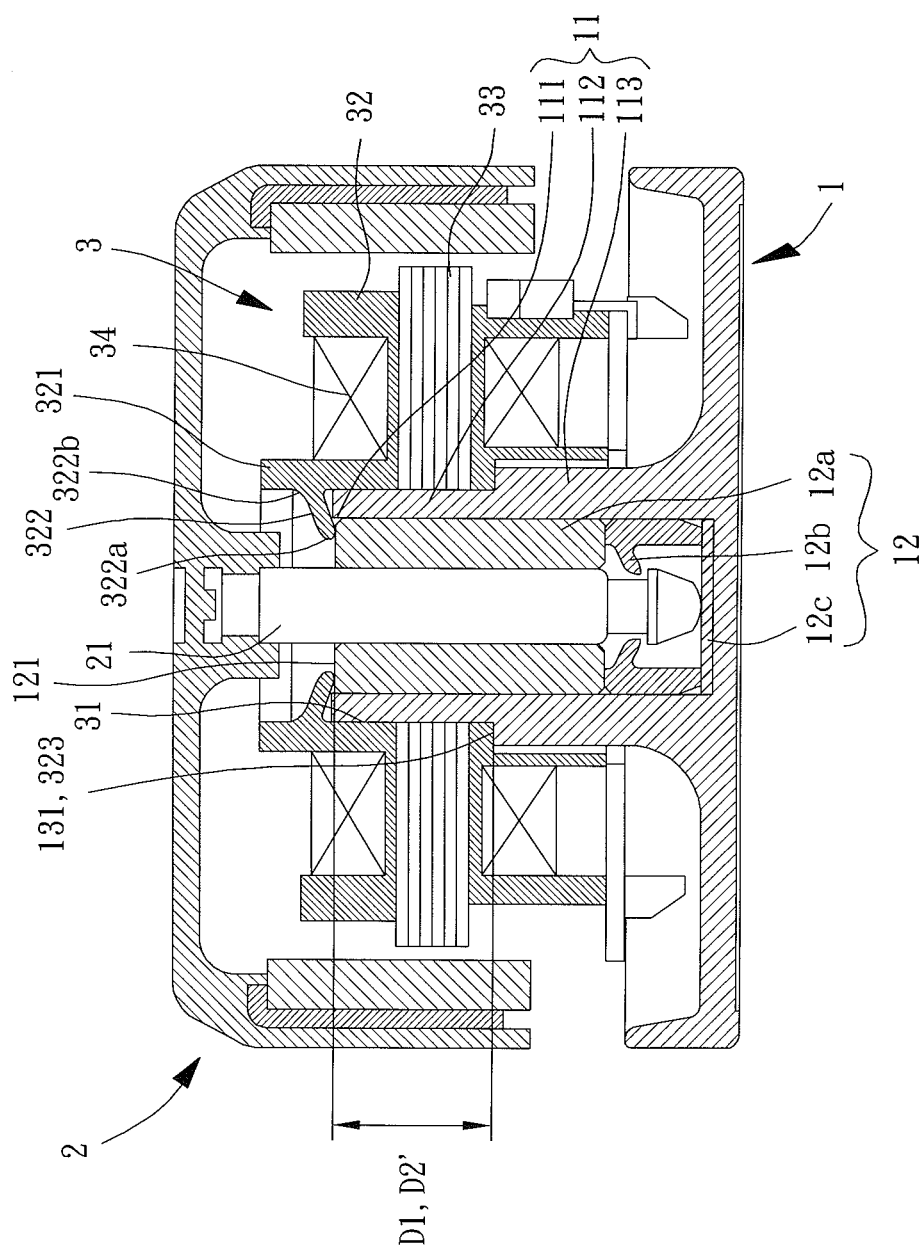
FIG. 5 shows an assembled and cross sectional view of the motor structure of the first embodiment according to the preferred teachings of the present invention.

Please refer to FIG. 5 now, which is a cross sectional view of the first embodiment of the proposed motor structure after the hosing 1, rotor 2 and stator 3 are assembled. With the above described structures, the stator 3 can firmly rest on the support face 131 of the positioning member 13 by the supported face 323 when the stator 3 is mounted on and around the shaft tube 11, as well as the top face 121 of the shaft retaining assembly 12 pushes the free end 322a of the abutting portion 322 upwards and thus the second distance D2 is enlarged to an extended second distance D2' equal to the first distance D1. Particularly, when the stator 3 rests on the support face 131, the free end 322a of the abutting portion 322 provides a downward pressure to the shaft retaining assembly 12 due to the reacting force of the bent abutting portion 322 against the upward push of the top face 121. As a result, when the stator 3 is mounted on and around the shaft tube 11, not only the support face 131 surely supports the stator 3 via the supported face 323 and fixes the axial position of the stator 3 relatively to the shaft tube 11, but also the abutting portion 322 keeps pressing the shaft retaining assembly 12 downwards for the bearing 12a, retaining plate 12b and supporting plate 12c to be tightly clamped between the free end 322a and the sealed bottom of the shaft tube 11. Therefore, the bent abutting portion 322 is prevented from being snapped since the stator 3 is supported by the support face 131. Besides, axial vibration of the rotor 2 in operation is minified because the bearing 12a, retaining plate 12b and supporting plate 12c are firmly fixed inside the shaft tube 11 and cannot cause any undesirable axial shift in operation.

Preferably, referring to FIGS. 3-5 again, there is a root end 322b of the abutting portion 322 in connection with the annular wall 321, and an axial distance from the root end 322b to the supported face 323 is larger than the second distance D2, so that the abutting portion 322 is in an inclined from extending inwards and downwards from the annular wall 321 to the top face 121. Accordingly, the abutting portion 322 can easily extend across the upper section 112 of the shaft tube 11 to press the shaft retaining assembly 12.

Figure 6:
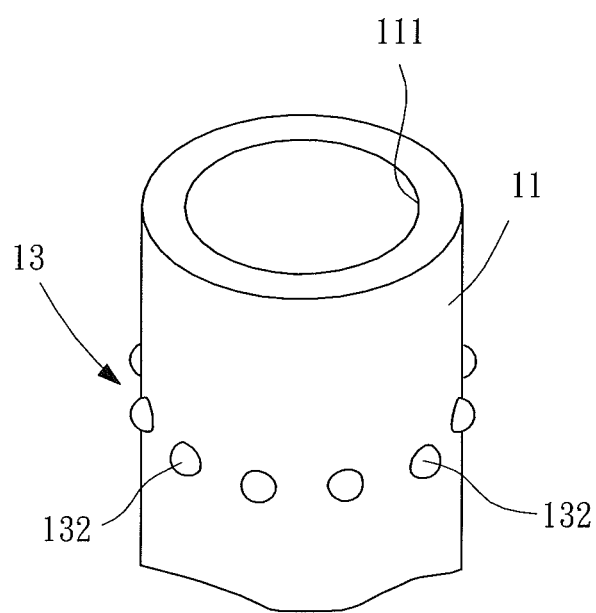
FIG. 6 shows a partial, perspective view of the shaft tube of a motor structure of a second embodiment according to the preferred teachings of the present invention.
Figure 7:
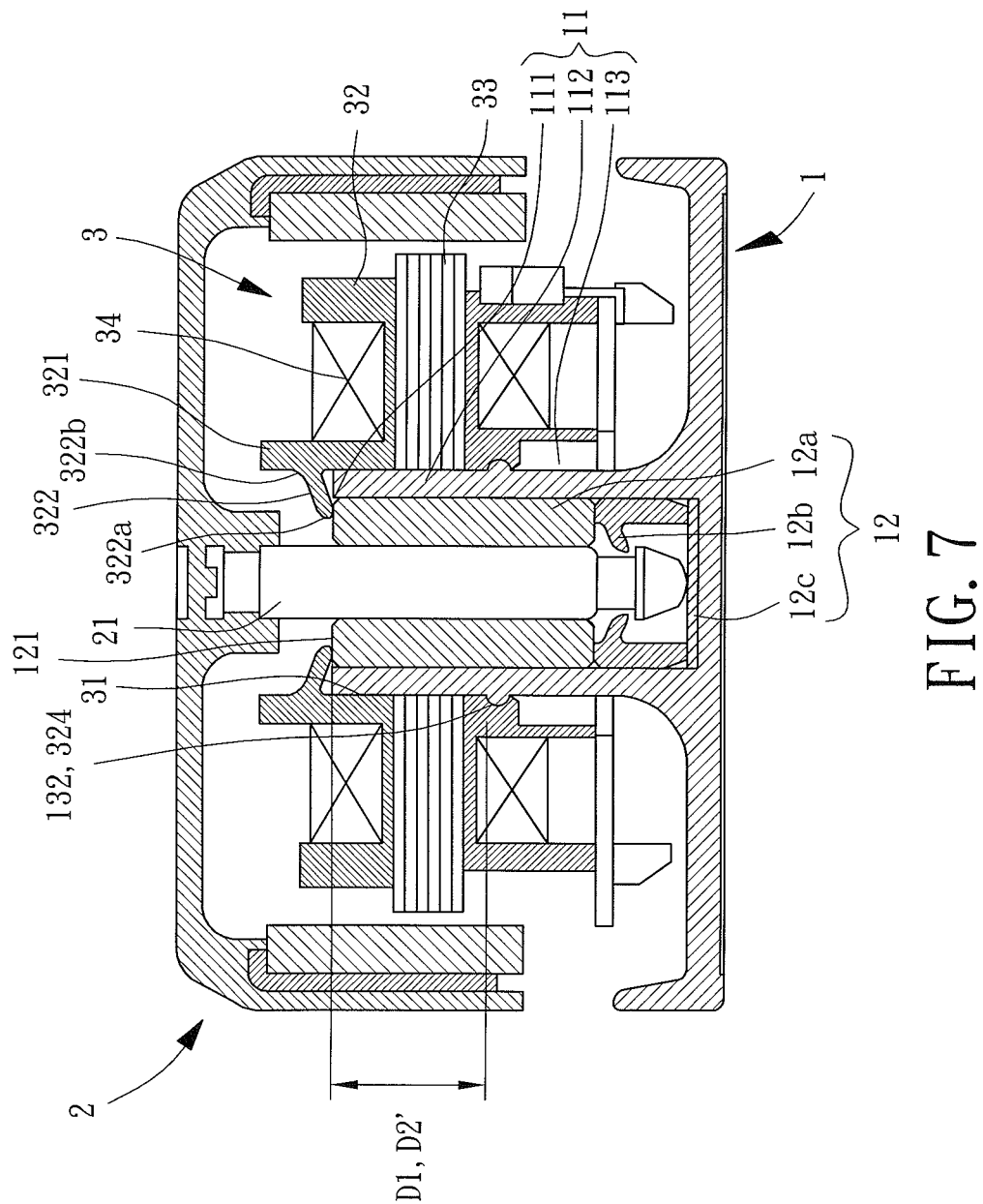
FIG. 7 shows an assembled and cross sectional view of the motor structure of the second embodiment according to the preferred teachings of the present invention.

FIGS. 6 and 7 show a motor structure of a second embodiment according to the preferred teachings of the present invention modified from the motor structure of the first embodiment, wherein the positioning member 13 of the shaft tube 11 includes a plurality of annularly spaced semi-spherical protrusions 132 on the outer periphery thereof, and the bobbin 32 further includes an annular groove 324 on an inner periphery thereof. During assembling of the stator 3 and shaft tube 11, the semi-spherical protrusions 132 are easily inserted into and engaged in the annular groove 324 to provide tight coupling between the stator 3 and the shaft tube 11 while the whole bobbin 32 is made of elastic material. Thus, the stator 3 is positioned in the fixed axial position with the abutting portion 322 elastically pressing the top face 121 of the shaft retaining assembly 12 downwards to prevent the shaft retaining assembly 12 from vibration and disengaging from the shaft tube 11.

Figure 8:
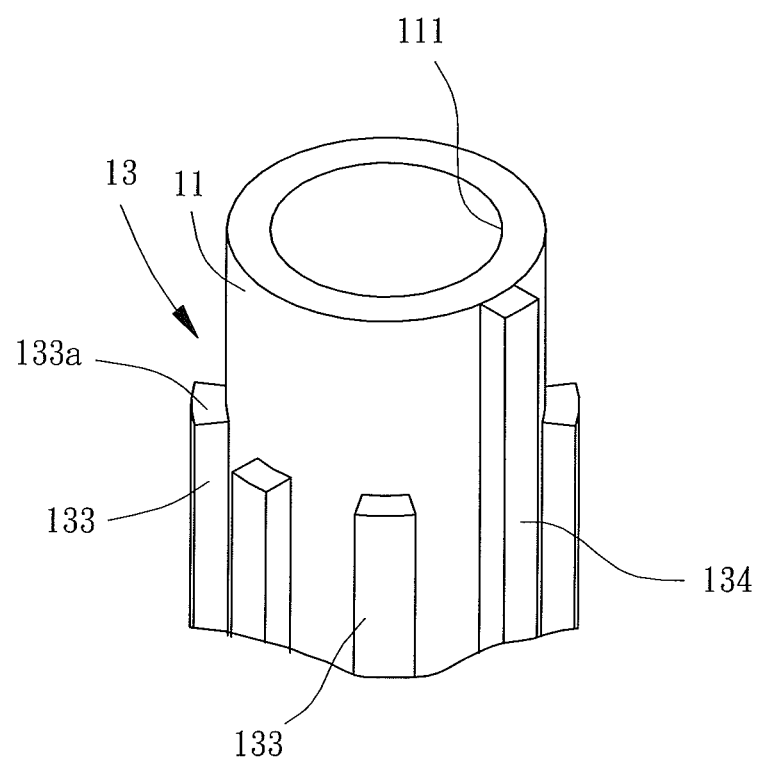
FIG. 8 shows a partial, perspective view of a shaft tube of a motor structure of a third embodiment according to the preferred teachings of the present invention.
Figure 9:
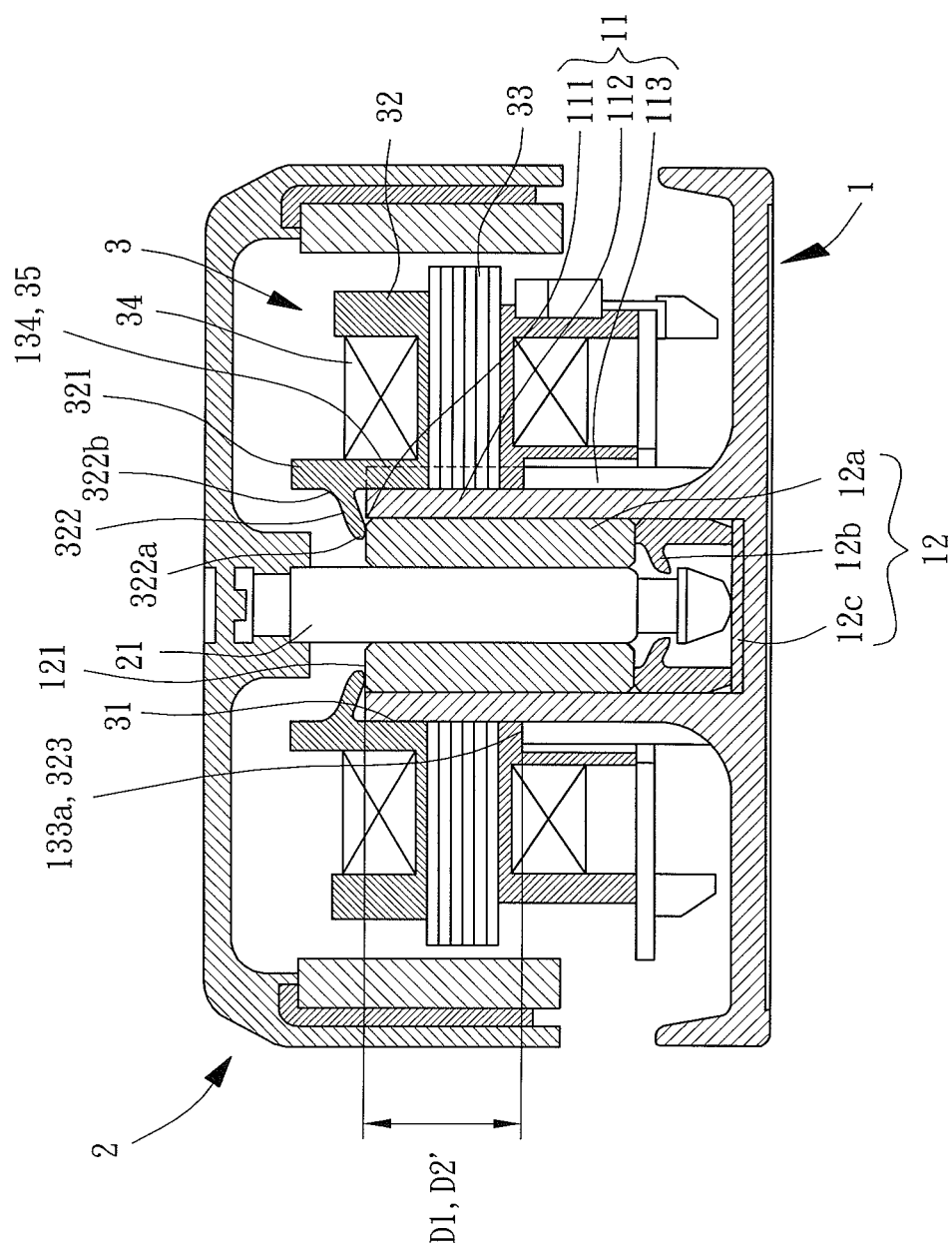
FIG. 9 shows an assembled and cross sectional view of the motor structure of the third embodiment according to the preferred teachings of the present invention.

FIGS. 8 and 9 show a motor structure of a third embodiment according to the preferred teachings of the present invention modified from the motor structure of the first embodiment, wherein the positioning member 13 of the shaft tube 11 includes a plurality of annularly spaced ribs 133 extending in the axial direction of the shaft tube 11. Each rib 133 has a support face 133a in an intermediate portion of the outer periphery of the shaft tube 11 spaced from the top edge of the shaft tube 11 and facing the upper opening 111. The outer periphery of the shaft tube 11 further includes a limiting rib 134 extending between and spaced from adjacent two of the ribs 133. The limiting rib 134 has an upper end extending to the top edge of the shaft tube 11. In addition to the supported face 323 forming the inner lower end of the bobbin 32, both of the bobbin 32 and silicon steel plates 33 have notches on inner peripheries thereof, with the notches of the bobbin 32 and silicon steel plates 33 being aligned to form an axial groove 35 extending from the supported face 323 upwards and communicating with the assembling hole 31. Accordingly, when the stator 3 and housing 1 are assembled, the supported face 323 rests on and is positioned by the support faces 133a of the ribs 133, and the limiting rib 134 is inserted in the axial groove 35 to prevent the stator 3 from rotation relative to the shaft tube 11.

In sum, Due to the elastic material of the abutting portion 322, the length of the second distance D2 being shorter than that of the first distance D1, and the positioning member 13 supporting and fixing the stator 3, once the stator 3 rests on the support face 131 of the positioning member 13 and is mounted around the shaft tube 11, the abutting portion 322 can elastically press the shaft retaining assembly 12 downwards. Consequently, by only one assembly step, not only the stator 3 but also the bearing 12a, retaining plate 12b and supporting plate 12c are firmly fixed on the housing 1. Thus, assembling convenience and reliable assembly are provided.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor structure comprising:
   a housing including a shaft tube having an upper opening, with a shaft retaining assembly being received in the shaft tube and having a top face adjacent to the upper opening, with the shaft tube including a positioning member on an outer periphery thereof, with the positioning member distant from the top face by a first distance in an axial direction of the shaft tube;
   a rotor including a shaft rotatably extending through the bearing; and
   a stator including an assembling hole receiving the outer periphery of the shaft tube, with the stator including a bobbin, a plurality of silicon steel plates coupled with the bobbin, and a winding wound around the plurality of silicon steel plates, with the stator coupling with the positioning member of the shaft tube, with the bobbin including an abutting portion pressing the top face of the shaft retaining assembly by a free end thereof;
   wherein the abutting portion is made of elastic material, a second distance between the positioning member and the free end in an axial direction of the assembling hole is defined, and the second distance is smaller than the first distance when the stator is separate from the shaft tube.

2. The motor structure as claimed in claim 1, with the bobbin including an annular wall forming an inner upper end of the bobbin, with the abutting portion connecting to the annular wall by a root end, and with an axial distance from the root end to the positioning member being larger than the second distance.

3. The motor structure as claimed in claim 1, with the shaft tube including an upper section and a lower section having an outer diameter larger than that of the upper section to form a support face of the positioning member, with the first distance being defined between the support face and the top face, with the bobbin further including a supported face forming an inner lower end of the bobbin, and with the stator coupling with the positioning member by connection of the support and supported faces.

4. The motor structure as claimed in claim 1, with the positioning member of shaft tube including a plurality of annularly spaced protrusions on the outer periphery thereof, with the bobbin including an annular groove on an inner periphery thereof, and with the plurality of protrusions being engaged in the annular groove to position the stator in the fixed axial position relative to the shaft tube.

5. The motor structure as claimed in claim 1, with the positioning member of the shaft tube including a plurality of annularly spaced ribs extending in the axial of the shaft tube, with each of the plurality of the ribs having a support face spaced from a top edge of the shaft tube, with the bobbin further including a supported face forming an inner lower end of the bobbin, and with the stator coupling with the positioning member by connection of the support and supported faces.

6. The motor structure as claimed in claim 5, with the outer periphery of the shaft tube further including a limiting rib extending between and spaced from adjacent two of the ribs, with the limiting rib having an upper end extending to the top edge of the shaft tube, with both of the bobbin and the plurality of silicon steel plates having notches on inner peripheries thereof, with the notches of the bobbin and silicon steel plates being aligned to form an axial groove extending from the supported face and communicating with the assembling hole, and with the limiting rib being inserted in the axial groove.

7. The motor structure as claimed in claim 1, with the stator being coupled on the outer periphery of the shaft tube by press coupling.

* * * * *